April 9, 1957
G. H. CHENEY
2,788,408
PRESSURE SWITCHES FOR WIND TUNNELS
Filed Sept. 10, 1954
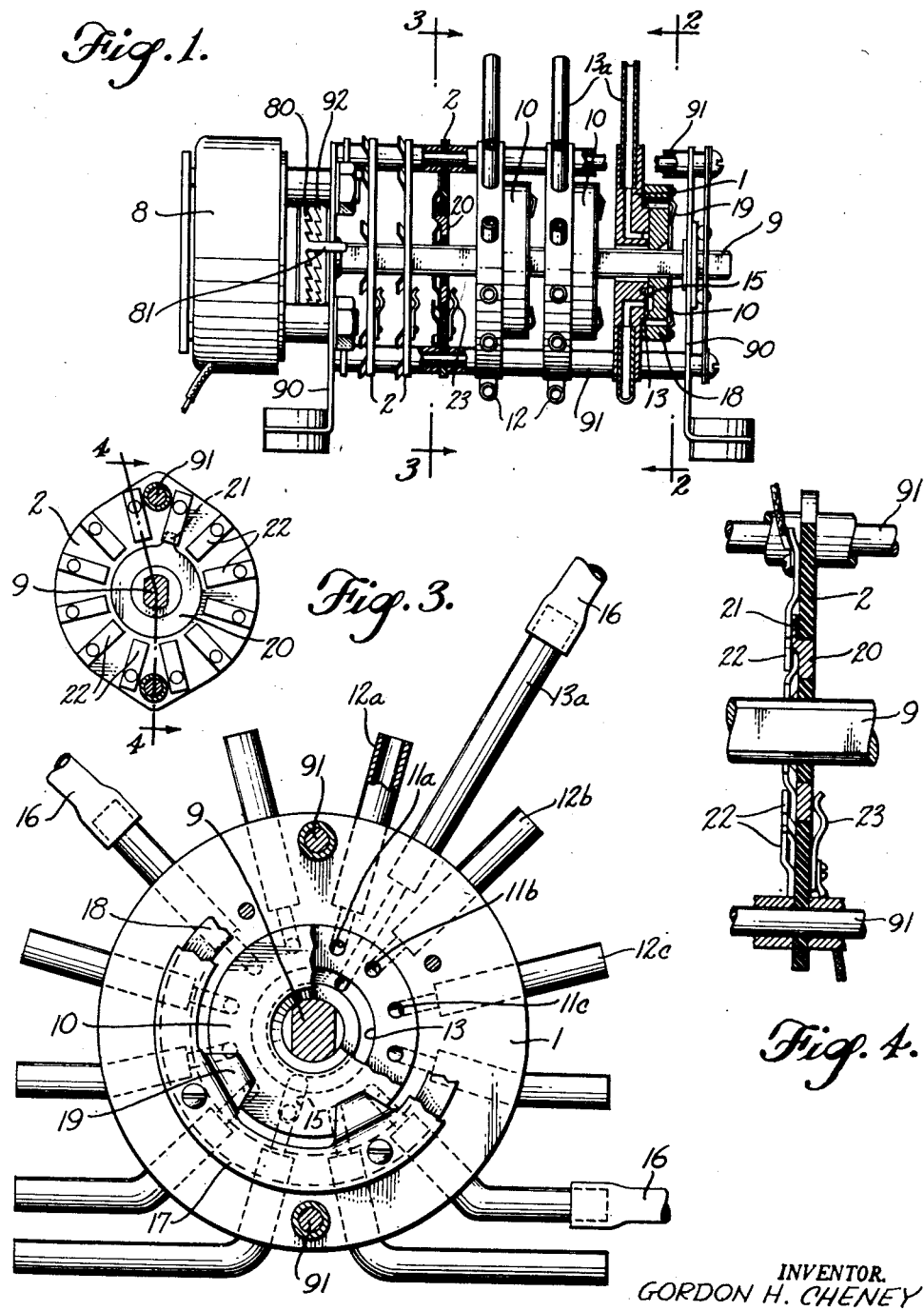
INVENTOR.
GORDON H. CHENEY
BY
Reynolds, Beach & Christensen
ATTORNEYS 2,788,408
Patented Apr. 9, 1957

United States Patent Office

2,788,408
PRESSURE SWITCHES FOR WIND TUNNELS

Gordon H. Cheney, Seattle, Wash., assignor to Boeing Airplane Company, Seattle, Wash., a corporation of Delaware Application September 10, 1954, Serial No. 455,327

5 Claims. (Cl. 200—61.86)

The switch of the present invention has been designed primarily for an automatic pressure recording system for use in wind tunnels. By its use, a number of pressure readings at different pressure pick-up points can be determined and recorded promptly and sequentially, and differential pressures can be determined. Simultaneously, each individual record is identified. All such records and identifications are made upon a chart, so that as a result there are obtained pressure data in final form in the shortest possible time, requiring no analysis, interpretation, nor conversion, and eliminating the use of multi-tube manometer boards, such as are space wasting, cumbersome to set up, of doubtful accuracy in cases where pressures are oscillating severly, and all of which require correlation and analysis before it is possible to utilize the data obtained, in order to vary the design of the surface being tested. By the present invention, then, the data is obtained directly, it can be correlated and identified through the pressure switch of this invention, and is ready for immediate use in printed form.

It is believed that invention resides primarily in the pressure switch consisting of a pressure section which includes one or several interrelated pressure valves for connection in sequence to a series of pressure pick-up points, and to convey the pressure to a recording device, coupled with an electrical section incorporating a like number of switches, also sequentially connectable in a sequence which corresponds to the sequence of connection to the pressure pick-up points, and connectable to a recording device which will record a symbol identifying the particular pressure pick-up point in conjunction with the reading recorded through the pressure switch.

Since, then, the invention is believed to reside in the switch itself, the description will be confined to the switch primarily, including the pressure section and the electrical section, and it is believed that the manner of connecting the same and of using the same to the ends indicated above will be clear after the construction of the switch as a whole is understood.

In the accompanying drawings, the invention is shown in a representative form.

Figure 1 is in part a side elevational view and in part an axial sectional view through the switch as a whole.

Figure 2 is an enlarged transverse sectional view on the line indicated at 2—2 in Figure 1, in the nature of an end elevation, broken away, of one of the pressure section units or valves.

Figure 3 is a cross-sectional view on the line indicated at 3—3 in Figure 1, in the nature of an end elevational view of one of the electrical section units or contactors.

Figure 4 is an enlarged sectional view, substantially on the line 4—4 of Figure 3, through the electrical contactor.

The pressure switch assembly includes a pressure section wherein one or more rotative valves control communication between successive selected pressure pick-up points and a recording instrument of known or suitable design, and an electrical section wherein a like number of rotative contactors or switch units control communication between a current source and an identifying recorder, part of the same instrument. Each valve and its corresponding contactor rotate step by step, and energize the recording instrument to make a record on the instrument's chart, of pressure at the corresponding pick-up point, and to identify that particular pick-up point. The rotative elements of the valve and of the corresponding contactor are connected for conjoint rotation.

A noncircular shaft 9 is supported, by a frame work consisting of the end plates 90 and the connecting rods 91, for rotation. Its rotation is not continuous, but step by step through successive angular amounts, but always in the same rotative sense, so that it has a unidirectional although intermittent rotation. Rotation can be effected in various ways, for example, by a solenoid unit 8, supported from one of the end plates 90, incorporating a driving ratchet wheel 80 which may be moved axially into engagement with a complemental driven ratchet wheel 92, and rotatively after such axial engagement. A stop element 81 engageable with the adjacent end frame 90 limits the rotational movement of the wheel 80 at each electrical impulse transmitted to 8 to a given angular amount, and spring means (not shown) restores parts 80, 81 to their initial position following each advance during which advance the wheel 92 and the shaft 9 have been advanced by the given angular amount. A ratchet drive of the type described is commercially available, and is designated as a Ledex Rotary Solenoid and Stepping Relay, supplied by G. H. Leland, Inc., of Dayton, Ohio.

The switch as a whole is divided into the two sections, an electrical section, and a pressure section. The pressure section includes one or more valve disks 1, supported from the rods 91 and by them held stationary, and a cooperating rotative valve wafer 10, radially grooved at 15 in its one face, which is fixed upon and rotative with the shaft 9. The valve disk 1 is provided with a plurality of ports 11a, 11b, 11c, etc., terminating in one face of the valve disk, and all arranged in a circle, concentric with the axis of rotation of the shaft 9. Each such port is arranged for connection, as by the radially protruding nipples 12a, 12b, 12c, etc., and tubing 16, to an individual pressure pick-up point. In addition to the ports 11a, 11b, etc., the valve disk is provided further with an annular groove 13 in the same face as that into which the individual ports open, but radially offset from the circle of such ports. This groove 13 is adapted for communication, as by means of the nipple 13a, to a pressure source, be that source one of positive or of negative pressure with relation to the pressure pick-up points to which the ports 11a, 11b, etc., are connected. In other words, there is always a pressure difference between each individual port 11a, 11b, etc., and the source to which the annular groove 13 connects.

The valve wafer 10 seats against the ported and grooved face of the valve disk, with its radial groove 15 located to afford communication between the annular groove 13 and some one of the ports 11a, 11b, etc., the particular one depending upon the rotated position of the wafer. The wafer is held to its seat by a spring ring 17, supported upon a rim 18 which encircles the wafer and is mounted upon the valve disk 1, which spring ring is formed with angularly spaced, radially inwardly directed spring fingers 19 which bear against the wafer's face which is opposite its seating face, to hold the seating face against the complemental seating face of the valve disk 1.

A purpose in providing more than one such pressure switch unit, if there be more than one, might be to permit one section, or more, to communicate with successive pressure pick-up points, or to permit two such switches to communicate simultaneously with two pick-up points, the pressures whereat are to be compared, and to permit a third one, for example, to function as a programming switch, so that after completion of a cycle of the first two switches, the relationship, or points of pick-up, can be altered, and a further sequence can be run to obtain further and comparative data.

Each electrical section unit comprises essentially a switch disk 2, preferably of insulating material, which is held stationary by connection to the frame rods 91, and a cooperating switch wafer 20, which is fixed upon and rotative with the shaft 9, and which carries a contact point 21 for engagement with a succession of switch points 22 angularly spaced in a circle about and supported from the switch disk 2. The switch points 22 are arranged in such manner with relation to their disk 2 that whenever the groove 15 connects a given port, such as 11a, with the groove 13, the common terminal 21 will contact that switch point 22 which is in a corresponding location. Thereby, by connecting the successive contact points 21 to individual identifying recorders, and by connecting the corresponding port 11a, 11b, etc., to an individual pressure pick-up point, the recorder may be made to record both the pressure observed through the port 11a, 11b, etc., and the identification of that pressure pick-up point through the corresponding switch connection. Both these indications may be made in juxtaposition upon a recording chart, through a recording instrument of known type. Current is fed through the switch wafer 20 by means of a brush 23.

Such a pressure switch as a whole is capable of great flexibility, and some of its uses and functions have been indicated above without the intention of restricting its use to those described.

I claim as my invention:

1. A switch of the character described, comprising a shaft, means mounting said shaft for rotative motion, means operable to advance said shaft unidirectionally by a plurality of individual steps, into each of a plurality of angularly spaced stations, a stationary valve disk through the center whereof said shaft extends, and a cooperating valve wafer fixed upon and rotative with the shaft, said valve disk having an annular groove disposed concentrically about the shaft and a port leading thence for connection to a pressure source, and having also individual ports distributed about its center for connection to individual pressure pick-up points, said individual ports being spaced angularly in correspondence with the angularly spaced stations at which the shaft stops, and the valve wafer having a port for connecting each individual port with said annular groove; a stationary switch disk through the center whereof said shaft extends, and a cooperating switch wafer fixed upon and rotative with the shaft and hence with the valve wafer, said switch disk having a plurality of individual switch points for connection to individual recording devices and which are spaced angularly about the disk's center in correspondence with the angularly spaced stations at which the shaft stops, and hence each corresponding to a single individual valve port, and the switch wafer having a complemental switch point for electrical connection to a power source, and located upon the switch wafer to contact that individual switch point which corresponds to the individual valve port with which the valve wafer's port is in communication.

2. A switch of the character set forth in claim 1, wherein the shaft-advancing means is electrically energized, and characterized in that the electrical connection of the wafer-mounted switch point is by way of the shaft-advancing means, to energize the latter for automatic further advance of the shaft substantially coincident with establishment of communication between the valve wafer's port and that individval port which corresponds to the contacted individual switch point.

3. A switch of the character set forth in claim 1, including a plurality of such stationary valve disks and cooperating shaft-mounted valve wafers, and a like number of such stationary switch disks and cooperating switch wafers, each corresponding and cooperating with a single one of said valve disks and wafers in the manner set forth in claim 1.

4. A valve for use in a recording mechanism of the character described, comprising a stationary circular valve disk having a number of individual ports terminating in one face and angularly spaced about a single circle, each for connection to individual pressure pick-up points, said valve disk having also an annular groove in the same face, radially offset from the circle of ports and concentric therewith, and a port leading thence for connection to a recording instrument, a circular rotative valve wafer seated upon the ported and grooved face of said valve disk, concentric with said disk, said wafer having a generally radially directed port located to register with the disk's annular groove and with any one of the individual ports, spring means encircling the wafer and supported from the valve disk, and bearing upon the wafer's surface which is opposite its seating surface to urge it tightly to its seat, and means to rotate said wafer about an axis coincident with the center of the circle of ports, to establish communication between the disk's annular groove and each successive individual port.

5. A valve for use in recording mechanism of the character described, comprising a stationary circular valve disk having a number of individual ports terminating in one face and angularly spaced about a circle, each for connection to individual pressure pick-up points, said valve disk having also an annular groove in the same face, radially offset from the circle of ports and concentric therewith, and a port leading thence for connection to a recording instrument, a circular rotative valve wafer seating concentrically upon the ported and grooved face of said valve disk, said wafer having a generally radially directed port located to register with the disk's annular groove and by rotation to register also with any one of the individual ports, a rim upstanding above the valve disk to a level approximating the thickness of the valve wafer, and encircling the latter, a substantially flat ring supported upon said rim and formed with a plurality of inwardly directed spring fingers bearing upon the wafer's surface to urge it tightly to its seat, and means to rotate said wafer about an axis coincident with the center of the circle of ports, to establish communication between the disk's annular groove and each successive individual port.

References Cited in the file of this patent
UNITED STATES PATENTS

| | | |
|---|---|---|
| 2,033,466 | Grant | Mar. 10, 1936 |
| 2,153,621 | Howard | Apr. 11, 1939 |
| 2,449,178 | Sansbury | Sept. 14, 1948 |
| 2,504,925 | Gardner | Apr. 18, 1950 |
| 2,572,640 | Lovegrove | Oct. 23, 1951 |
| 2,572,974 | Berger | Oct. 30, 1951 |